INVENTOR.
CURT PLEGER

INVENTOR.
CURT PLEGER

Nov. 23, 1971     C. PLEGER     3,621,618
APPARATUS FOR PRODUCING AND MACHINING CYCLIC NON-ROUND PROFILES
Filed Sept. 29, 1969     4 Sheets-Sheet 4
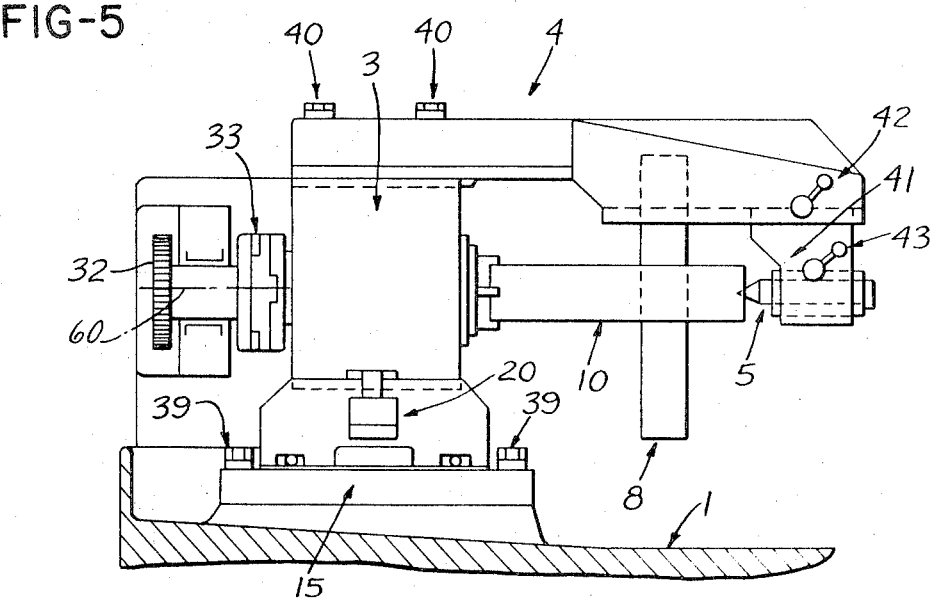
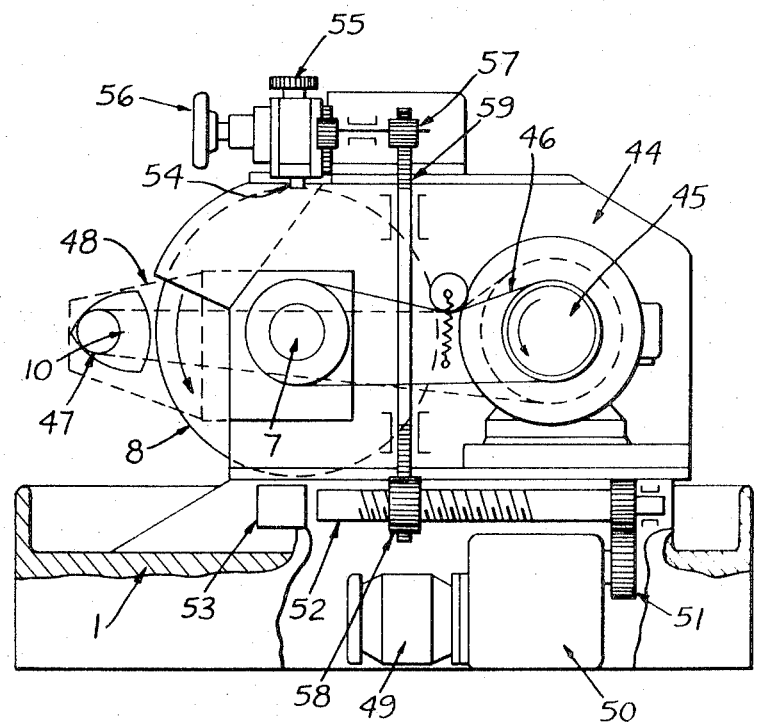
INVENTOR.
CURT PLEGER
BY United States Patent Office 3,621,618
Patented Nov. 23, 1971

3,621,618
APPARATUS FOR PRODUCING AND MACHINING CYCLIC NON-ROUND PROFILES
Curt Pleger, Oberrieden-Zurich, Switzerland, assignor to Fortuna-Werke Maschinenfabrik Aktiengesellschaft, Stuttgart-Bad Cannstatt, Germany
Filed Sept. 29, 1969, Ser. No. 861,607
Claims priority, application Germany, Oct. 1, 1968, P 18 00 349.1
Int. Cl. B24b 17/02
U.S. Cl. 51—101
10 Claims

ABSTRACT OF THE DISCLOSURE

An apparatus wherein a tool forms a non-circular profile on a rotating workpiece. The workpiece is mounted on a workpiece spindle and an eccentric control cam is mounted on a control spindle which is parallel to and spaced from the workpiece spindle. A push rod and a lever engage the control cam and impart motion to the workpiece spindle in two directions at right angles to each other in a plane normal to the axis of the workpiece spindle The workpiece spindle and the control spindle are drivingly interconnected so the speed of the former equals the speed of the latter multiplied by a whole number.

The present invention relates to an apparatus for producing and machining cyclic non-round profiles on the outer or inner circumference of a work piece rotated about its axis by means of a rotating tool while a relative movement occurs between the work piece spindle and the tool bearing means along a profile shaping elliptic control cam. The components of movement of said control cam, which are perpendicular to each other, are in the direction of the feed adjustment of the tool and perpendicular thereto are derived from the circumference of an adjustable circular eccentric, while the ratio of the speed of said eccentric to the ratio of the workpiece spindle is a whole number in conformity with the number of corners of the non-round profile.

The non-round profiles to be produced are intended primarily for slide fit, tight fit or close fit, or are intended for use as control cams. This makes it necessary that relatively close machining tolerances are maintained which can be realized only by means of as precise an elliptic relative movement path as possible by locating the center of the rotating tool always in the normal of the non-round profile on the respective area to be machined. Theoretically, it would be possible to have the relative movement carried out by the tool or the work piece.

With heretofore known devices of the above mentioned type, however, the two components of the relative movement between the work piece spindle and the tool bearing means are transferred from the circumference of the circular eccentric by means of push rods closely engaging said eccentric and at least by means of a transfer lever is always onto the bearing means for the tool which bearing means is movably guided transverse to its axis in two directions perpendicular to each other, while the bearing means for the work piece spindle neither carries out nor permits a transverse movement.

The rotating tool is normally a grinding disc the bearing of which is located at the free end of an elbow joint rocker arrangement, the other end of which has fixedly arranged a motor in the framework of the apparatus. This motor drives the grinding disc by means of two serially arranged belt drives which follow said rockers. This arrangement with the movement of the tool bearing means relative to the bodily "resting" work piece was obviously selected originally and had then been maintained because from a structural standpoint it is simple and can easily be checked. The relative control movement was transferred to the bearing for the tool shaft the high speed of rotation of which is independent of the speed of the eccentric shaft and of the speed of the work piece spindle. Variations in the speed of rotation of the tool shaft have no disadvantageous effect. The arrangement of the circular eccentric in the longitudinally displaceable wheel stand made it possible to design in a compact manner the transfer of the control cam components and thus to realize a high precision of the elliptic control cam.

In order to make the coupling between the circular eccentric and the work piece spindle as slip-free as possible, either gear transmissions with sliding shafts or an electric shaft was employed between the eccentric drive and the work piece spindle drive.

The ever-increasing requirements as to precision of the profile shape of the non-round profiles or for maintaining particularly narrow fitting tolerances, made it necessary to increase the parts structurally and also required an increase in the material for the devices for machining such profiles. Moreover, considerable difficulties have been encountered to maintain the obtained machining precision and quality over any longer period of operation.

It is, therefore, an object of the present invention to provide an apparatus which will overcome the above mentioned drawbacks, or at least considerably reduce the same.

These and other objects and advantages of the invention will appear more clearly from the following specification in connection with the accompanying drawings, in which:

FIG. 1 diagrammatically illustrates an overall view of a machine tool according to the present invention.

FIG. 5 is an end view of the machine tool showing the workpiece drive and holding means.

Figure 1:
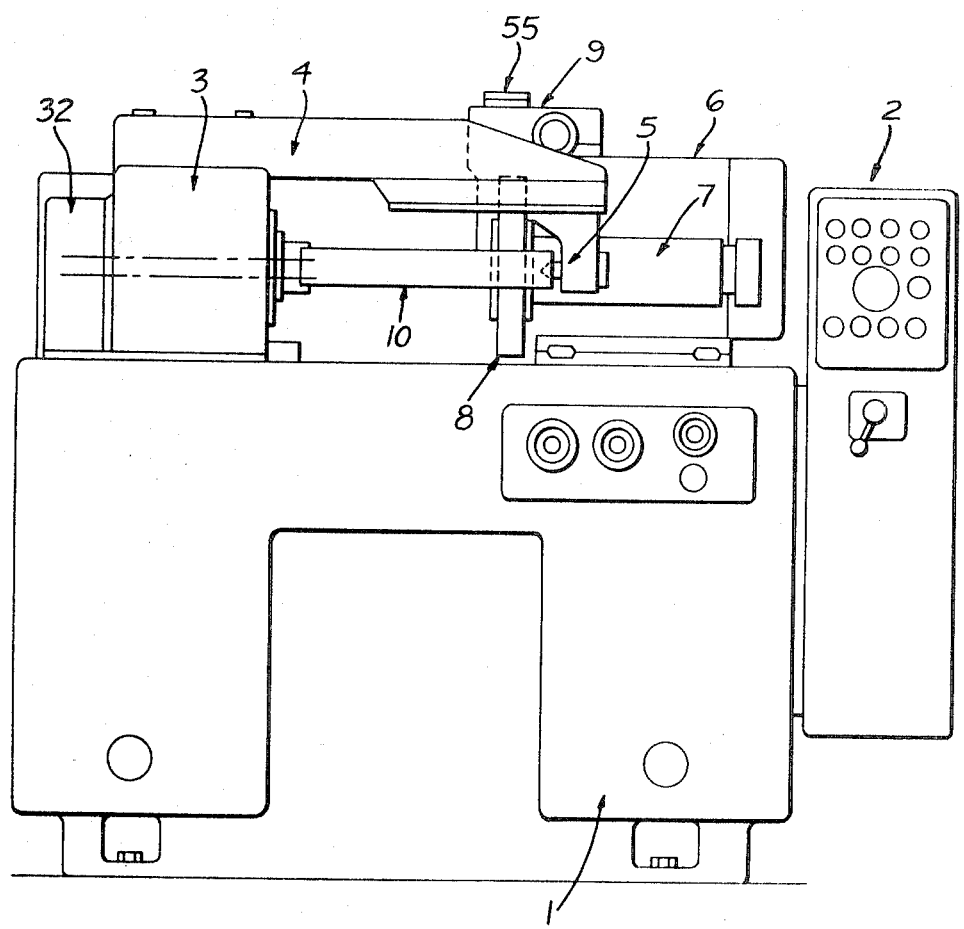

FIG. 6 diagrammatically illustrates the drive for the grinding disc with a diamonding device (Diamantiereinrichtung) and with an automatic post-adjustment for the grinding disc.

The present invention is based on the finding resulting from numerous observations, that with the above mentioned design of the heretofore known devices for producing and machining cyclic non-round profiles, a further increase in the machining precision and quality could be realized only by means of the use of additional material and work which, however, is uneconomically prohibitive, while the duration of operation during which the high requirements can be met without overhauling the device remains rather limited.

Surprisingly, a return to the start in the development of the devices for producing non-round profiles and picking up a possibility which originally was cast aside by the designers as unsuitable, namely the possibility of an elliptic movement of the bearing means for the workpiece spindle relative to the practically stationary bearing means for the tool, has led to a new embodiment which, in spite of technical problems which first appeared rather difficult to solve and raised considerable fear with regard to the machining precision, has proved progressive with regard to the increased requirements.

The apparatus according to the invention for producing and machining cyclic non-round profiles on the outer or inner circumference of a workpiece rotated about its axis by means of a rotating tool while a relative movement occurs between the workpiece spindle and the tool bearing means along a profile shaping elliptic control cam is characterized primarily by the following features:

(a) The workpiece spindle bearing means is guided transverse to the axis thereof in the direction of the feed adjustment of the tool and perpendicular thereto along coordinate guiding means and is moved along the elliptic control cam by means of push rods or lever transfer elements acting in the direction of said guiding means and supported on the circumference of the circular eccentric.

(b) The rotary drive of the workpiece spindle is effected by the shaft of the said eccentric through the intervention of a stepped transmission and an angle-true or homo-kinetic clutch following said transmission and permitting transverse movements of the workpiece spindle.

(c) The journalling of the tool remains independent of the circular eccentric and is provided for feeding and longitudinal displacement.

The movement of the workpiece spindle mounting in the two coordinate directions of the elliptic control cam will, in view of the smaller masses to be accelerated and again to be retarded, especially of the rotating masses, require smaller push rod forces than the movement of the relatively difficult tool mounting necessary for damping interfering oscillations. Thus, also the wear of the surfaces of the eccentric which slide upon each other and of the elements for transferring the components of movement will be reduced.

The workpiece spindle driven by the circular eccentric shaft through the stepped transmission and the homokinetic clutch, rotates at an angular velocity which is precisely proportional to the angular velocity of the eccentric shaft which varies somewhat in view of the acceleration and retardation of the masses. As to the transfer of the torque to the workpiece, no great variations in the torque occur so that also a low elasticity in the transfer will remain without disadvantageous effects upon the angular velocity-proportionality.

With heretofore known devices, the drive of the eccentric shaft and the workpiece spindle is effected through at least partially separated conveying or transfer means while the elasticity in the separate transmitting branches brought about variations in the relationship of the angular velocities, and thereby caused lack of precision in the normal adjustment of the tool relative to the workpiece and, consequently, also lack of precision in the non-round profile shape.

The tool mounting for which practically only a feeding and longitudinal stroke movement is to be provided can be designed very stable and can be fixedly arranged in a heavy and thereby stiff wheel stand which will prevent any interfering oscillations at least to a considerable extent. In this way, the great difficulties concerning the design of a possibly oscillation- and vibration-free mounting of the fact rotating tool as they have heretofore been encountered have been overcome.

The above mentioned three new features of the apparatus according to the invention bring about an increase in the machining precision and in the useful work output without necessitating the overhauling of essential mechanism of the apparatus.

In view of the design of the apparatus according to the invention, it is also possible to provide an extremely rigid transmission chain between the eccentric shaft and the workpiece spindle, which chain comprises a plurality of gears with short shafts. This is possible since this transmission does not take part in the movement of the workpiece spindle mounting and therefore can be designed heavier, which fact has a favorable influence on the precision of the profiles to be produced.

This rigid and vibration-free design will, over heretofore known designs, permit a considerably heavier chip removal and thereby will increase the economy of the machine. This new heavy construction, which is not elastic as to any element, even permits employing the machine as roughing sliding machine for working from the solid round material and even the employment of the machine as turning machine for machining inner and outer surfaces. This greatly simplifies and facilitates the manufacture of non-circular profiles in view of the elimination of expensive premachining apparatuses and the like.

For purposes of suppressing shocks of the work piece spindle mounting which might be caused by the "resting" of the forces of inertia of the masses on the rotating eccentric, which masses are to be accelerated and again to be retarded, it has proved advantageous to drive the eccentric through a worm drive which has a damping effect.

The homokinetic clutch could comprise two cross joints arranged at the ends of a particularly short and therefore rigid shaft. Preferably, however, the homokinetic clutch forms a cross disc clutch. This type of clutch permits an extremely compact design with complete freedom of torsion stiffness. The output part of the clutch advantageously drives the tool spindle directly.

According to a further development of the invention, when employing a two-arm oscillating lever for increasing the control movement perpendicular to the direction of the tool adjustment, there may be provided a fine adjustment of the lever pivot bearing in the longitudinal direction of the lever. Said fine adjustment may be effected by means of an adjusting spindle. In this way, corrections of the profile shape can easily be effected.

The direction of rotation of the work piece may be the same or the opposite one as the direction of rotation of the tool. For small variations of the angular velocity in the work piece rotary drive, it may be advantageous to rotatably drive the work piece by the grinding disc and to effect a braking by a coupling with the motor only when the friction in the homokinetic clutch will be insufficient for this purpose.

Figure 3:
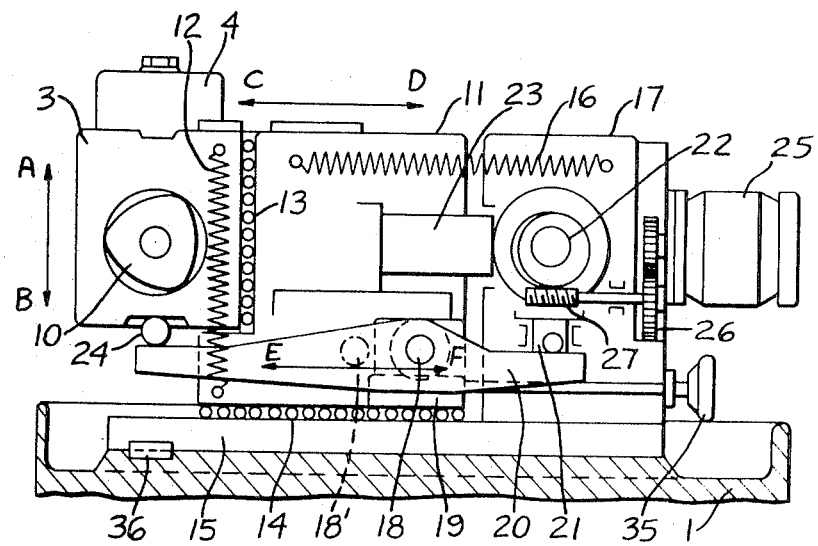
FIG. 3 shows a control mechanism for the control of the movement of the work piece drive.

Referring now to the drawings in detail, the machine tool illustrated therein comprises a machine stand 1 with an electric control box 2, a work piece spindle mounting 3, holding means 4 with spindle sleeve or tail spindle 5, wheel stand 6 with grinding spindle 7 for outer surface grinding and grinding disc 8 as well as a diamond device 9. The work piece 10 may, particularly with short grinding length, be clamped on the working spindle in clamping means or may also be held at the other end in the holding means 4 by means of the tail spindle 5. The holding means 4 are detachable and may be employed selectively. The work piece spindle mounting 3 is held play-free in the vertical plane in the vertical guiding housing 11 by means of roller guiding means 13, and by springs 12 (FIG. 3) is pulled in downward direction. The housing 11 in its turn is guided in horizontal roller grinding means 14 on a base plate 15 in a horizontal plane and in a play-free manner, and by means of springs 16 is pulled toward the rear against the transmission housing 17. The work piece spindle mounting or the work piece 10 will thus be able to carry out coordinate movements in a vertical and a horizontal plane. The machine tool according to the invention furthermore comprises a supporting bearing 18 which is built into a movable holder 19 displaceable in a direction transverse to the axes of the work piece and tool, and carries a rocker 20 which in its turn supports the work piece spindle mounting 3 from the lower side and on the other hand, through the intervention of a guiding plate 21 engages an adjustable eccentric 22 from below. Thus, eccentric 22 will be able to transfer movements from the circumferential surface of the eccentric to the work piece spindle mounting in vertical direction at a transmission ratio which is adjustable either by displacing the supporting bearing 18 to the position 18' or by displacing the holder 19. In the horizontal direction, a push rod 23 rests against the eccentric 22 which push rod is rigidly connected to the horizontally movable housing 11. In view of the rotary movement of the eccentric 22, by means of the plate 21 and rocker 20 as well as the push rod 23, coordinate transfer movement to the work piece spindle mounting 3 is effected in a vertical and in a horizontal plane. With a transmission ratio of the lever 20 which deviates from the value 1, the curve of movement of the center of the work piece spindle mounting is represented by an ellipse. In order to assure a compensation of the movement of the oscillating arm or rocker 20 with regard to the work piece spindle mounting, there is provided a roller body 24 between the work piece spindle mounting 3 and the oscillating arm or rocker 20.

The drive of work piece 10 and eccentric shaft 22 is effected by a motor 25 first through a transmission 26 and a worm drive 27 to the eccentric shaft 22 and from the latter through a stepped transmission 28 and 29 driven by the eccentric shaft for speed ratios between the eccentric shaft and tool spindle of 1:1, 2:1, 3:1 and 4:1, and coupling gears 30, 31 and 32 and a homokinetic clutch to the work piece spindle. The last mentioned gear 32 is mounted on a transmission output shaft 60 to which the input part of the angle-true or homokinetic clutch, in this instance, a cross disc clutch 33, is connected. The output part of said clutch, which is shiftable transverse to the axis, is directly coupled to the work piece spindle. This cross disc clutch permits a mutual displacement of the axes of the output shaft 60 of the transmission and of the work piece spindle mounting 3 in horizontal as well as in vertical direction up to approximately 20 millimeters. Such a transverse displacement will be sufficient for the control ellipses of the relative movement between work piece and tool, even with larger non-round profiles.

Figure 4:
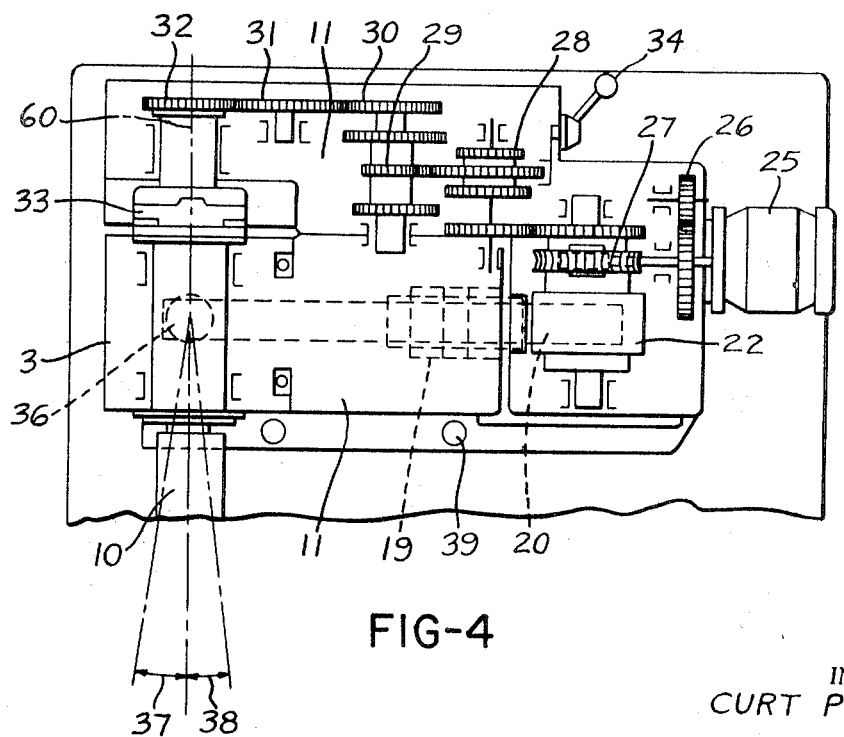
FIG. 4 is a top view of the workpiece drive according to the invention.

By means of a manually operable lever 34, the machine tool without requiring a gear change can be converted from round grinding 1:1 to eccentric grinding and non-round contour grinding with two corners, three corners and four corners. If any changes in the shape of the profile are desired or if corrections are to be made, these can be realized by horizontally displacing the supporting bearing 18 by means of an adjusting spindle 35. A conical grinding is effected by pivoting the complete unit comprising the coordinate grinding means and the eccentric, about a pivot pin 36 so that the angles (FIG. 4) 37 and 38 can be realized. The bracing of the pivoting device or plate 15 is effected by means of screws 39. The counter holder 4 is, by means of two screws 40, held to the work piece spindle mounting 3. The spindle holder 41 is adjustably mounted on the holder 4 by means of a lever 42. The tail spindle 5 may be adjusted (FIG. 5) by means of a lever 43.

A grinding disc 8 with a grinding spindle 7 is rigidly mounted in the grinding support 44. The drive of the grinding spindle 7 is effected by the motor through the intervention of a belt 46. Additionally, an inner surface grinding spindle 47 with a support 48 may be arranged on the grinding support 44. The adjustment in the transverse direction or the feed adjustment of the grinding disc or the grinding feeding is effected by means of a motor 49 through a transmission 50 and a gear transmission 51 and a spindle 52 with depth abutment 53 for the measured feed. The automatic diamonding device comprises the diamonding insert 54 with feed screw 55, a manual transverse adjusting mechanism 56 and an automatically effective feed compensation of the wear of the grinding disc toward the transverse spindle 52 through the intervention of gears 57 and 58 and a vertical rack.

Figure 2:
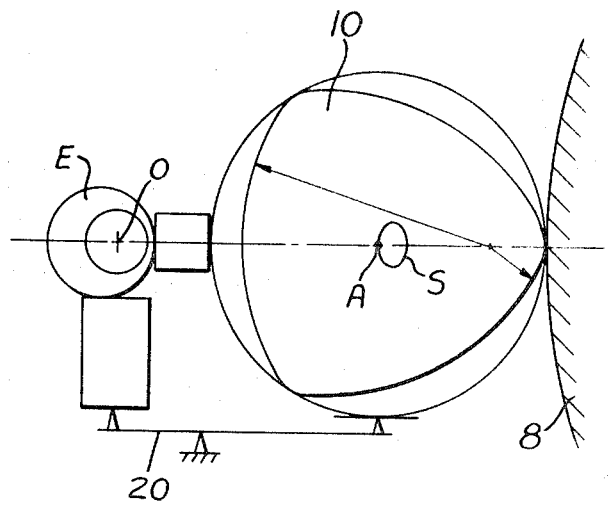
FIGS. 2, 2a and 2b illustrate three different successive positions of the work piece relative to the tool.

In order, when grinding out-of-round or non-circularly, to eliminate any influence by grinding disc diameter differences, the grinding is always carried out in the cam normal which will be realized by a corresponding adjustment as to height of the work piece relative to the grinding disc by the eccentric through the intervention of the oscillating lever 20. The individual courses of movement which are obtained from the transfer of the eccentric movement in horizontal and vertical direction to the work piece spindle, are illustrated in FIGS. 2–2b. In conformity with FIG. 3, a displacement of the work piece spindle mounting is effected in the direction of the arrows A–B and C–D.

According to FIG. 2, the axis A of the work piece spindle receiving the work piece 10—of a triangular polygonal profile is located on the apex of the control ellipse S which is farthest from the axis of the tool. The rocker 20 adjusted for a transmission ratio of 1:2 has a horizontal position, and the axis A is located at the same level as the center 0 of the eccentric shaft. The tool machines the apex of a profile corner.

Figure 2A:
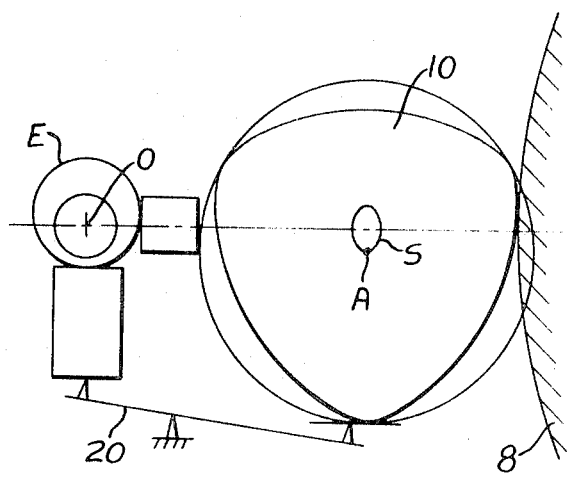
Figure 2B:
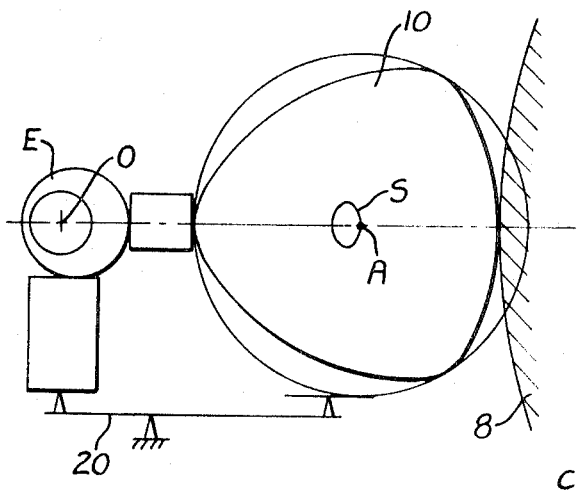

After rotating the eccentric shaft by 90° in clockwise direction and a precisely proportional rotation of the work piece 10 in counter-clockwise direction by 30°—in view of the fixed rotary angle ratio of 3:1—, the axis A and with the latter the work piece have moved to the lower apex of the ellipse, and the tool 8 machines an area of the triangular polygon profile, which area is located far above the connecting line between the work piece axis and the tool axis while, however, the curve normal of the profile contour passes through the axis of the tool (FIG. 2a).

Subsequently, the axis A again moves upwardly until, in conformity with FIG. 2b it engages the other side of the ellipse S at the flat apex thereof and the tool machines the central portion of a side of the polygon profile.

The further movements of the axis A along the contour of the control ellipse S can easily be ascertained from a further rotation of the eccentric E and the work piece 10.

It will be evident that lack of precision in the angle-true or precisely angle-proportional coupling between the eccentric E and the workpiece 10 also errors in the guiding of the axis A along a precise ellipse will lead to errors in the contour of the polygon profile which will make the employment of the polygon profile impossible for purposes which require a very narrow tolerance.

The eccentric 22 forms in a manner known per se an adjustable eccentric the eccentricity of which is infinitely variable between two given values, for instance zero and a maximum valve. A correction of the profile is possible by displacing the supporting bearing 18 in the direction of the arrows E–F.

It is, of course, to be understood that the present invention is, by no means, limited to the particular construction shown in the drawings but also comprises any modifications within the scope of the appended claims.

What is claimed is:

1. A machine for generating non-circular profiles on a workpiece about the axis of rotation of the workpiece and comprising: a frame, a control spindle supported rotatably in said frame, and an eccentric control cam mounted on said control spindle to be rotated thereby, a workpiece spindle for supporting a workpiece for rotation on the axis of said spindle and workpiece spindle support means mounted in rectilinear guide means on said frame for rectilinearly guided movement relative to said control spindle in first and second directions angularly related to each other and in a plane normal to the axis of said workpiece spindle, drive means having two coupling members arranged movably in relation to each other in a direction transverse to the axis of the workpiece spindle and interconnecting said workpiece spindle and said control spindle for rotation of the workpiece spindle at a speed equalling the speed of the control spindle multiplied by a whole number independently of the movement of said workpiece spindle support means relatively to the control spindle in said plane normal to the axis of the the workpiece spindle, push rod means reciprocable in said frame and lever means tiltable in said frame and each at one end engaging the eccentric periphery of said control cam and at the other end acting on said workpiece spindle support means for imparting a periodical motion to said workpiece spindle support means relatively to said control spindle in said first and second angularly related direction respectively in response to rotation of said control cam, and forming tool means mounted in said frame and operatively engageable with a workpiece supported by said workpiece spindle.

2. A machine according to claim 1 in which said drive means comprises a change gear transmission having an input shaft drivingly connected to said control spindle and having an output shaft for driving said workpiece spindle and a homokinetic coupling connecting said output shaft to said workpiece spindle and permitting movement of said workpiece spindle in said first and second angularly related directions.

3. A machine according to claim 1 in which said first and second directions are at right angles to each other.

4. A machine according to claim 3 in which said first direction is in the direction in which said spindles are spaced.

5. A machine according to claim 1 which includes means for moving said forming tool means on said frame in angularly related directions relative to said workpiece spindle.

6. A machine according to claim 1 which includes a drive motor and a worm drive connecting said drive motor to said control spindle to drive the control spindle and the control cam mounted thereon while also driving said drive means and workpiece spindle.

7. A machine according to claim 2 in which said homokinetic coupling comprises a first part connected to said output shaft a second part connected to said workpiece spindle and a disc drivingly connecting said parts and permitting relative motion periodically therebetween in a direction transverse to the axes thereof.

8. A machine according to claim 1 which includes a pivot support member on said frame supporting the pivot for said lever and means for adjusting said pivot support in said frame in the direction of the length of said lever thereby to change the amount of motion imparted to said workpiece spindle supporting means in said second direction by said control cam.

9. A machine according to claim 1 in which said workpiece spindle and control spindle are adjustable angularly as a unit in said frame relative to said forming tool means.

10. A machine according to claim 1 in which said forming tool means comprises a first tool adapted to engage a radially outwardly facing circumferential portion of said workpiece and a second tool adapted to engage a radially inwardly facing circumferential portion of said workpiece.

References Cited

UNITED STATES PATENTS

| | | | |
|---|---|---|---|
| 2,553,831 | 5/1951 | Musyl | 51—101 |
| 2,754,633 | 7/1956 | Balsiger | 51—105 |
| 3,403,479 | 10/1968 | Feveirinha | 51—101 X |
| 2,592,875 | 4/1952 | Dusland | 51—101 UX |
| 2,606,403 | 8/1952 | Musyl | 51—101 X |

HAROLD D. WHITEHEAD, Primary Examiner